July 23, 1963 CLAUS-HOLMER GERDES 3,098,508
MIXING VALVE
Filed May 5, 1960
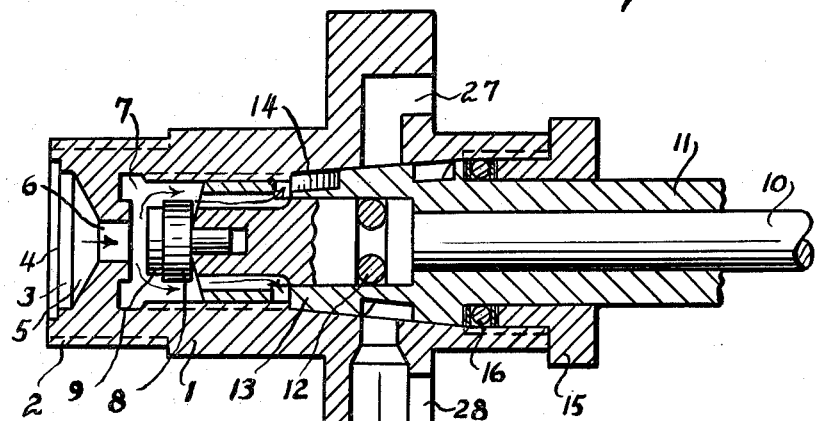
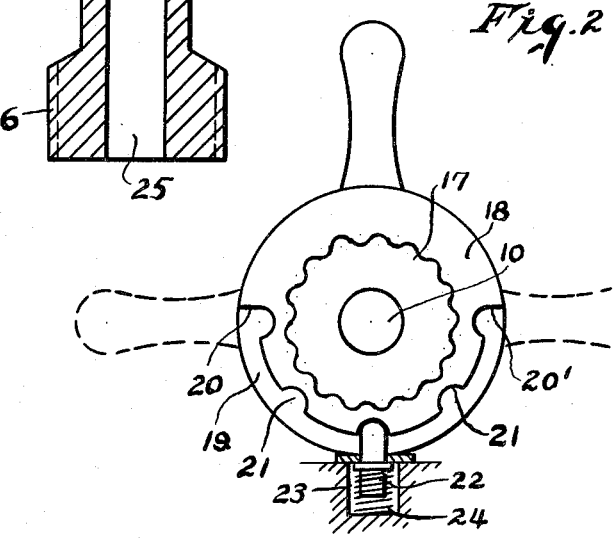
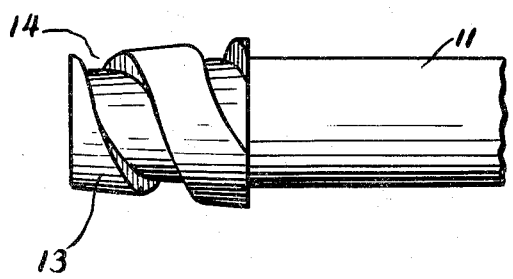
INVENTOR.
CLAUS-HOLMER GERDES
BY
Mestern & Mestern 3,098,508
MIXING VALVE
Claus-Holmer Gerdes, 18a–b Carl-Peters-Strasse, Luneburg, Germany
Filed May 5, 1960, Ser. No. 27,178
Claims priority, application Germany May 8, 1959
7 Claims. (Cl. 137—637.4)

Double fittings or mixing batteries with two valves for the infinitely variable mixing of hot and cold water and other liquids have already become known in the art. These fittings have, however, the drawback that one of the valves is arranged in the path of the hot water and thus affected by the always changing temperatures of the hot water.

It is the object of the invention to eliminate this drawback and to provide a double fitting in which both valves are arranged in the path of the cold water.

A double fitting for mixing hot and cold water and other liquids in infinitely variable proportions comprises a housing, a first valve operable by a spindle and a co-axial second valve operable by a hollow spindle in said housing, both valves disposed in the path of cold liquid, and said first valve being arranged to serve as a stop element and said second valve being arranged to serve as a pilot valve and devised as valve cone.

In a construction like this the path of the cold water can be pre-selected by the second valve in such manner that either the entire quantity of cold water is supplied to a heating element, or that, with the second valve correspondingly adjusted, the supply to the heating element is bridged over and the cold water is connected through short-cut with the discharge end of the fitting.

In addition to this the invention contemplates a device for use in feeding a portion of the quantity of the cold water to the heating element for heating through adjustment of the second valve in a position located between the predetermined two end positions, whereby a flow out of water of medium temperature is produced. The entire quantity of the heated water and of the cold water passing directly to the discharge end, is hereby determined through the adjustment of the first valve.

The end positions of the second valve may be determined by rigid stops. In addition to this there may be provided intermediate positions for mixing water through stops of just slight resistance which can be easily passed over if desired.

A preferred embodiment of the invention will now be described by way of example and with reference to the accompanying drawing, in which:

FIG. 1 is a longitudinal sectional view of a novel type double fitting adjusted in cold water discharge position;

FIG. 2 is an elevational view of the operating elements of the valves, whereby the lever of the second valve is shown in the position for mixed water and the positions for cold water discharge and for hot water discharge have been indicated in dash lines;

FIG. 3 is an elevational view of the external valve showing details of the recess in the valve cone.

A valve housing 1 is fastened to the end of a cold water supply conduit by means of the thread 2 of a screwed cap, not shown in the drawing. The cold water passes via a hair sieve 3, secured in position by means of a spring ring 4, into an entrance chamber 5 of the housing 1. The entrance chamber 5 is in communication with a valve chamber 7 by means of a nozzle-like passage 6. The flow of the cold water through the passage 6 may be controlled by a first or inner valve comprising a valve body 8 provided with a packing plate 9. This inner valve is actuated by a spindle 10 which is carried in a hollow spindle 11 of a second or external valve and sealed by means of a packing ring 12. The hollow spindle 11 is rigidly secured to a hollow valve cone 13 which is provided at its circumference with a worm-like winding recess 14 extending throughout the entire length of the valve cone 13. The hollow spindle 11 with the hollow valve cone 13 is secured in the housing 1 by means of a collar nut 15 and sealed by a packing ring 16.

In the position of the two valves, shown in FIG. 1, the cold water passes from the valve chamber 7 via the worm-like winding recess 14, circumflowing the valve cone 13, into a discharge outlet 25 provided with a thread 26 for the mounting of, for example, a rotatable tap. In this valve position a water channel 27, leading to a preferably electric heating element (not shown in the drawing), is closed up by the valve cone 13.

However, a rotation of the valve cone 13 through 180 degrees establishes the connection between the valve chamber 7 and the water channel 27. After the liquid has passed from here through the heating element it is led back via a hot water return bore 28 into the fitting and leaves the latter as hot water via the discharge outlet 25.

By a corresponding positioning of the valve cone 13 between 0 and 180 degrees every required mixing ratio between cold water and hot water can be adjusted.

FIG. 2 shows a contrivance for the actuation of the valve cone 13 and simultaneously the actuation of the inner valve by means of the spindle 10. An operating knob 17 is arranged on the spindle 10 for the actuation of the inner valve. This contrivance is positioned in the middle of an actuating handle 18 which is rigidly secured to the hollow spindle 11 of the valve cone 13. The hub of the handle 18 is provided with a semi-circular recess 19 with end stops 20 and 20' which may border any angle between 30 and 180 degrees. The rotation in both directions of the handle 18 is limited, for example, by the end stops 20 and 20' coming to rest against a pin 22. In the illustration shown in the drawing the handle 18 is in middle position and produces on the valve cone 13 in combination with the appertaining position of the worm-like winding recess 14 preferably an outflow of mixed water consisting half of it of cold water and half of it of hot water.

In addition to the adjustment shown in FIG. 2 any desired adjustment of the handle 18, and consequently also of the worm-like winding recess 14, is possible. However, in order to facilitate the operation of the device several adjustments (settings) have been marked by a stop offering just slight resistance so that they can be passed over without much difficulty if desired. As shown in FIG. 2, the construction is so devised that the hub of the handle 18 is provided at its circumference with recesses 21 in which engages the curved end of the pin 22 which by means of a spring 24 is yieldingly supported in a recess 23, whereby this locking contrivance can be passed over without much resistance by means of the handle 18 of the device. In the form of construction shown in FIG. 2 there have been shown in addition to the control recess in which the handle 18 engages two further recesses 21 establishing through engagement in them a ratio of mixing of either one quarter or three quarters. However, it is also possible to provide for the engagement of the handle 18 any desired number of recesses.

The constructions heretofore described provide a double fitting for hot and cold liquids of all kinds with a remarkable range of regulating possibilities.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A fitting for the infinitely variable mixing of hot and cold water comprising, in combination, a valve housing; an entrance chamber for cold water from a cold water supply conduit; an internal plate valve consisting of a valve body provided with a packing plate and arranged for opening and closing the entrance chamber and controlling the entire quantity of water passing through the fitting; a spindle connected to the internal plate valve for actuating the same; an external distributing valve with a hollow valve cone which is rigidly secured to a hollow spindle and has in its outer surface a spiral-shaped recess, extending throughout the entire length thereof; a discharge outlet disposed substantially below said hollow cone, facilitating a straight downward flow of the water; an opening in said housing substantially above said hollow cone, adapted to lead and facilitate the flow of the water to a heating element; said discharge outlet having a side inlet through which heated water enters said outlet; said recess serving for the preselection of the path of the cold water from said entrance chamber to said discharge outlet and to the opening; both said valves being independently operable by means of their spindles, the spindle of the internal valve plate being located in the hollow spindle of the external distributing valve.

2. The fitting as defined in claim 1, wherein the valves are located in cylindrical and conical bore-holes merging one into the other so as to have an outwardly increasing diameter, so that the internal plate valve and the external distributing valve are arranged in the valve housing as a unit.

3. The fitting as defined in claim 1, wherein the actuating spindles of the valves are provided with annular packing means which seal the spindles with respect to each other and with respect to the housing.

4. The fitting as defined in claim 1, wherein the packing plate is positioned freely rotatably on the spindle of the internal plate valve.

5. The fitting as defined in claim 1, wherein an actuating handle is fastened on the hollow spindle of the external distributing valve, said handle having end stops to limit its rotation in both directions.

6. The fitting as defined in claim 5, wherein the actuating handle of the external distributing valve is provided over the actuating range with shallow recesses in which engages a stop element in the way of a spring-urged pin.

7. The fitting as defined in claim 6, wherein the spring-urged pin is devised as a stop for end positions of the actuating handle.

References Cited in the file of this patent

UNITED STATES PATENTS

| | | |
|---|---|---|
| 359,131 | Clark | Mar. 8, 1887 |
| 1,208,709 | La Rue | Dec. 12, 1916 |
| 2,551,697 | Palmatier | May 8, 1951 |
| 2,789,579 | Kowaski | Apr. 23, 1957 |
| 2,810,395 | Simmons | Oct. 22, 1957 |
| 2,847,031 | Brown | Aug. 12, 1958 |

FOREIGN PATENTS

| | | |
|---|---|---|
| 535,215 | Great Britain | Apr. 2, 1941 |
| 1,103,769 | France | Nov. 7, 1955 |
| 1,029,638 | Germany | May 6, 1958 |
| 1,192,779 | France | Oct. 28, 1959 |